United States Patent [19]

Patel

[11] Patent Number: 5,576,271
[45] Date of Patent: Nov. 19, 1996

[54] COMPOSITION AND PROCESS FOR STABILIZING VISCOSITY OR CONTROLLING WATER LOSS OF POLYMER-CONTAINING WATER BASED FLUIDS

[75] Inventor: Bharat B. Patel, Bartlesville, Okla.

[73] Assignee: Phillips Petroleum Compay, Bartlesville, Okla.

[21] Appl. No.: 298,740

[22] Filed: Aug. 31, 1994

Related U.S. Application Data

[63] Continuation-in-part of Ser. No. 61,639, May 12, 1993, abandoned.

[51] Int. Cl.⁶ ............................................. C09K 7/02
[52] U.S. Cl. .................. 507/110; 507/111; 507/112; 507/113; 507/114; 507/115; 507/120; 507/140
[58] Field of Search .................. 507/110, 111, 507/112, 113, 114, 115, 120, 140, 141, 145

[56] References Cited

U.S. PATENT DOCUMENTS

| | | | |
|---|---|---|---|
| 3,185,642 | 5/1965 | Sawyer et al. | 252/8.5 |
| 3,346,013 | 8/1982 | Cadolle | 507/114 |
| 3,852,201 | 12/1974 | Jackson | 252/8.5 A |
| 3,909,454 | 9/1975 | Azrad | 507/113 |
| 4,240,924 | 12/1980 | Block | 252/317 |
| 4,257,903 | 3/1981 | Kucera | 507/111 |
| 4,366,070 | 12/1982 | Block | 507/114 |
| 4,405,468 | 9/1983 | Haun, Jr. | 252/8.5 B |
| 4,461,714 | 7/1984 | Burbs | 252/184 |
| 4,486,335 | 12/1984 | Majenwicz | 507/113 |
| 4,519,922 | 5/1985 | Sutton et at | 507/111 |
| 4,519,923 | 5/1985 | Hori et al. | 507/110 |
| 4,582,614 | 4/1986 | House et al. | 252/8.5 A |
| 4,664,843 | 4/1987 | Burba et al. | 252/315.5 |
| 4,748,139 | 5/1988 | Burba | 501/120 |
| 4,900,457 | 2/1990 | Clarke-Sturman | 507/114 |
| 4,941,982 | 7/1990 | Dadgar et al. | 507/113 |
| 4,990,268 | 2/1991 | Burba, III et al. | 507/110 |
| 5,009,798 | 4/1991 | House et al. | 507/114 |
| 5,196,143 | 3/1993 | Burba et al. | 252/315.5 |
| 5,232,627 | 8/1993 | Burba et al. | 252/315.5 |

FOREIGN PATENT DOCUMENTS

| | | | |
|---|---|---|---|
| 2044317 | 10/1980 | United Kingdom | C09K 7/04 |
| 2097447 | 11/1982 | United Kingdom | C09K 7/02 |

OTHER PUBLICATIONS

Derwent WPI Abstract 85-011286, (1985).
Derwent WPI Abstract 85-120865, (1985).
Derwent WPI Abstract 87-077731, (1987).
Patent Abstract of Japan, vol. 13, No. 211 (C-597), 1989.

*Primary Examiner*—Philip Tucker
*Attorney, Agent, or Firm*—Lucas K. Shay

[57] ABSTRACT

A composition useful for viscosifying a water-based fluid is provided which comprises a polymer such as guar gum, a metal compound such as an aluminum compound. The composition can also contain a polymer such as guar gum, a magnesium compound such as magnesium oxide, a metal aluminate such as sodium aluminate or a metal compound such as an aluminum compound, and optionally a fatty acid or salts thereof. The water-based fluid can also contain a clay such as bentonite. A process for viscosifying a water-based fluid and for substantially retaining the viscosity of the water-based fluid is also provided which comprises contacting the fluid with the composition described herein. Also disclosed is a process for controlling water loss of a water-based drilling fluid wherein the process comprises contacting the fluid with the composition described herein.

48 Claims, No Drawings

COMPOSITION AND PROCESS FOR STABILIZING VISCOSITY OR CONTROLLING WATER LOSS OF POLYMER–CONTAINING WATER BASED FLUIDS

This is a continuation-in-part of application Ser. No. 08/061,639, filed May 12, 1993 now abandoned.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Chemicals are added to the water-based fluids for various reasons that include, but are not limited to, controlling water loss, increasing viscosity, reducing corrosion, inhibiting biodegradation, and increasing the density of the fluids. For example, chemicals such as, for example, water-thickening polymers serve to increase the viscosity of the water-based fluids, when used as workover fluids or completion fluids, to retard the migration of the brines into the formation and to lift drilled solids from the wellbore.

However, the above-discussed chemicals are often unstable at the temperatures of various oil reservoirs and are often subject to biodegradation. Furthermore, fluids containing the chemicals often lose their viscosity or water loss control, or both, after aging at low temperatures.

It is therefore highly desirable to develop a composition and a process for applications that require high viscosity development. It is also highly desirable to develop a composition and a process which retain proper viscosity or control water loss, or both, of the composition over a broad range of conditions. It would also be a significant contribution to the art if a composition and process that are capable of controlling water loss under a variety of conditions in oil field work.

SUMMARY OF THE INVENTION

It is an object of the invention to provide a composition useful in oil field applications. It is another object of the invention to provide a process for retaining the viscosity or controlling water loss, or both, of a polymer-containing water-based fluid. It is also an object of the invention to provide a composition which upon becoming viscosified in an aqueous medium is thermostable. A further object of the invention is to provide a viscosified aqueous composition useful as drilling fluid, milling fluid, or mining fluid. Still another object is to provide a process for water loss control of the viscosified aqueous fluid. Other objects, aspects, and advantages of the invention will become more apparent as the invention is more fully disclosed hereinbelow.

According to a first embodiment of the invention, a composition capable of viscosifying a clay-containing, water-based fluid is provided which comprises a polymer; a magnesium compound; an additive selected from the group consisting of metal aluminate, a metal compound, and combinations of two or more thereof; and optionally, a fatty acid or a salt thereof wherein the metal of the metal compound is selected from the group consisting of aluminum, iron, manganese, zinc, tin, and combinations of two or more thereof. The composition can also be used to maintain the viscosity of, or to control water loss of, a water-based fluid.

According to a second embodiment of the present invention, a composition that is capable of viscosifying a clay-containing, water-based fluid and is useful in an oil field application is provided which comprises a polymer and a metal compound wherein the metal of the metal compound is selected from the group consisting of aluminum, iron, manganese, zinc, tin, and combinations of two or more thereof and wherein the oil field application is selected from the group consisting of retaining the viscosity of a water-based fluid, controlling the water loss of a water-based fluid, and combinations thereof.

According to a third embodiment of the invention, a process for retaining viscosity of or controlling water loss of a clay-containing, water-based fluid which can be useful as drilling fluid is provided which comprises contacting said fluid with a composition which comprises a polymer; a magnesium compound; an additive selected from the group consisting of a metal aluminate, a metal compound, and combinations of two or more thereof; and optionally a fatty acid or a salt thereof wherein the metal of the metal compound is selected from the group consisting of aluminum, iron, manganese, zinc, tin, and combinations of two or more thereof.

According to the fourth embodiment of the invention, a process for an oil field application is provided which comprises contacting a water-based fluid with a composition which comprises a polymer and a metal compound wherein the metal of the metal compound is selected from the group consisting of aluminum, iron, manganese, zinc, tin and combinations of two or more thereof and wherein the oil field application is selected from the group consisting of retaining the viscosity of a water-based fluid, controlling the water loss of the water-based fluid, and combinations thereof.

DETAILED DESCRIPTION OF THE INVENTION

The term "aqueous" used in the invention is generically referred to as, unless otherwise indicated, "of, relating to, or resembling water". Thus an aqueous composition referred to in the invention denotes a composition containing either water, a solution, or a suspension wherein the solution or suspension contains dissolved, partially dissolved, or undissolved salts. Examples of salts that can be present in an aqueous composition in the present invention include, but are not limited to, sodium chloride, sodium bromide, sodium iodide, potassium chloride, potassium bromide, calcium chloride, calcium bromide, magnesium chloride, magnesium bromide, barium chloride, zinc chloride, zinc bromide, sodium sulfate, strontium chloride, and mixtures thereof. Generally the total salts content in the composition can vary widely from 0% (water) to as high as 80 weight %. The typical total salts content is in the range of from about 0.001 weight % to about 30 weight %. For example, a produced brine which is defined as the brine co-produced with oil or gas, or both, which generally is a hardness brine, i.e., containing at least 1,000 ppm of $Ca^{+2}$, $Ba^{+2}$, $Mg^{+2}$, or $Sr^{+2}$, or combinations thereof. A produced brine generally contains high salinity of from about 1% to about 30% total dissolved solids.

Similarly, the term "fluid" used in this application is referred to as, unless otherwised indicated, a solution, or suspension, or both.

According to the first embodiment of the invention, a composition useful in substantially retaining the viscosity of a water-based fluid, or preventing water loss of clay-containing water-based fluids, or both, which can be used in oil field applications is provided which comprises a polymer; a magnesium compound; an additive selected from the group consisting of a metal aluminate, a metal compound, and combinations of two or more thereof. The clay useful in the invention can be any clay. Examples of suitable clays include, but are not limited to, kaolinite, halloysite, vermiculite, chlorite, attapulgite, smectite, montmorillonite, illite, saconite, sepiolite, palygorskite, Fuller's earth, and mixtures thereof. The presently preferred clay is montmorillonite clay. The presently most preferred clay is sodium montmorillonite, which is also known as bentonite.

Any polymer that can increase the viscosity of the composition can be used in the first embodiment of the invention. The term "polymer" used herein denotes, unless otherwise indicated, a homopolymer, a copolymer, a terpolymer, or a tetrapolymer. Polymers suitable for use in the composition are those capable of further increasing the viscosity of the composition in aqueous form and include, but are not limited to, polysaccharides, cellulose ethers, and acrylamide-based polymers. These polymers are commercially available.

Example of suitable cellulose ethers are those disclosed in U.S. Pat. No. 3,727,688. The particularly preferred cellulose ethers include, but are not limited to, carboxymethylhydroxyethyl cellulose, carboxymethyl cellulose, methyl cellulose, hydroxypropylmethyl cellulose, hydroxypropyl cellulose, hydroxyethyl cellulose, and combinations of two or more thereof.

The term "polysaccharide" used herein refers to, unless otherwise indicated, macromolecules composed of many monosaccharide units such as, for example, glucose linked by glycosidic bonds. Examples of polysaccharides include, but are not limited to, starches, gums, heteropolysaccharides, and combinations of two or more thereof.

Examples of suitable starches include those selected from the group consisting of carboxymethylstarch, hydroxyethylstarch, hydroxypropylstarch, and combinations thereof.

Examples of suitable gums are those selected from the group consisting of arabic, trajacanth, karaya, shatti, locust bean, guar, psyllium seed, quince seed, agar, algin, carrageenin, furcellaran, pectin, gelatin, larch gum, and combinations of two or more thereof.

Suitable heterobiopolysaccharides can be those disclosed in U.S. Pat. No. 4,068,714 such as polysaccharide B-1459 which is biopolysaccharide produced by the action of *Xanthomonas campestris* bacteria. Examples of suitable heterobiopolysaccharides can also include those selected from the group consisting of polysaccharide produced by the action of *Xanthomonas campestris*, *Xanthomonas phaseoli*, *Xanthomonas mulvacearn*, *Xanthomonas carotae*, *Xanthomonas translucens*, *Xanthomonas hederade*, *Xanthomonas papavericoli*, *Hansenula holstii*, *Arthorobacter viscous*, *Methylomonas mucosa*, *Erwinia tahitica* and *Azotobacter indicus*.

Suitable acrylamide-based polymers can be disclosed in U.S. Pat. No. 3,749, 172. Thermally stable polymers of acrylamide, such as poly(N-vinyl-2-pyrrolidone-co-acrylamide), poly(sodium-2-acrylamido-2-methyl-1-propanesulfonate-co-acrylamide-co-N-vinyl-2-pyrrolidone), and poly(sodium-2-acrylamido-2-methyl-1-propanesulfonate-co-acrylamide), are preferred for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, and methyl methacrylate.

Other miscellaneous polymers suitable for use in the present invention include partially hydrolyzed polyacrylonitrile, polystyrene sulfonate, lignosulfonates, and methylolated polyacrylamides.

The magnesium compound suitable for use in the first embodiment of the invention can be any magnesium compound that, when added to the water-based fluid, makes the resulting composition non-acidic, i.e. at pH 7 or higher. Examples of suitable magnesium compounds include, but are not limited to, magnesium oxide, magnesium chloride, magnesium hydroxide, magnesium acetate, magnesium formate, magnesium propionate, magnesium butyrate, magnesium adipate, magnesium oxalate, magnesium carbonate, magnesium citrate, magnesium lactate, and mixtures thereof. The presently preferred magnesium compound is magnesium oxide because of its low cost, safety, and availability.

Generally, any metal aluminate that, when present in the composition, can protect water loss of the water-based fluids containing a polymer can be used in the invention. Examples of the metal aluminates suitable for use in the invention include, but are not limited to, an alkali metal aluminate, an alkaline earth metal aluminate, and mixtures thereof. The presently preferred metal aluminate is an alkali meal aluminate such as, for example, lithium aluminate, sodium aluminate, potassium aluminate, and mixtures thereof. Among the alkali metal aluminates, sodium aluminate is most preferred because of its low cost and ready availability.

Any metal compound that, when used in the composition, can prevent the water loss of a water-based fluid containing the composition, can be used in the invention. The metal compound can be an aluminum compound, a manganese compound, an iron compound, a zinc compound, a tin compound, and combinations of two or more thereof. The presently preferred metal compound is a metal sulfate.

The aluminum compound can be an aluminum halide such as, for example, aluminum chloride, aluminum bromide, and aluminum iodine; an aluminum carboxylate such as, for example, aluminum formate, aluminum acetate, aluminum propionate, aluminum butyrate, aluminum stearate, and aluminum adipate; aluminum sulfate; aluminum phosphate; aluminum nitrate; and combinations of two or more thereof. The presently preferred aluminum compounds are aluminum chloride (especially aluminum chloromonohydrate), aluminum sulfate, aluminum acetate, and combinations of two or more thereof because of their low cost and availability.

The ferric compound can be an ferric halide such as, for example, ferric chloride, ferric bromide, and ferric iodine; an ferric carboxylate such as, for example, ferric formate, ferric acetate, ferric propionate, ferric butyrate, ferric stearate, and ferric adipate; ferric sulfate; ferric phosphate; ferric nitrate; and combinations of two or more thereof. The presently preferred ferric compounds are ferric chloride, ferric sulfate, ferric acetate, and combinations of two or more thereof because of their low cost and availability.

The ferrous compound can be an ferrous halide such as, for example, ferrous chloride, ferrous bromide, and ferrous iodine; an ferrous carboxylate such as, for example, ferrous formate, ferrous acetate, ferrous propionate, ferrous butyrate, ferrous stearate, and ferrous adipate; ferrous sulfate; ferrous phosphate; ferrous nitrate; and combinations of two or more thereof. The presently preferred ferrous compounds are ferrous chloride, ferrous sulfate, ferrous acetate, and combinations of two or more thereof because of their low cost and availability.

The manganese compound can be an manganese halide such as, for example, manganese chloride, manganese bromide, and manganese iodine; an manganese carboxylate such as, for example, manganese formate, manganese acetate, manganese propionate, manganese butyrate, manganese stearate, and manganese adipate; manganese sulfate; manganese phosphate; manganese nitrate; and combinations of two or more thereof. The presently preferred manganese compounds are manganese chloride, manganese sulfate, manganese acetate, and combinations of two or more thereof because of their low cost and availability.

The zinc compound can be an zinc halide such as, for example, zinc chloride, zinc bromide, and zinc iodine; an zinc carboxylate such as, for example, zinc formate, zinc acetate, zinc propionate, zinc butyrate, zinc stearate, and zinc adipate; zinc sulfate; zinc phosphate; zinc nitrate; and combinations of two or more thereof. The presently preferred zinc compounds are zinc chloride, zinc sulfate, zinc acetate, and mixtures thereof because of their low cost and availability.

The stannic compound can be an stannic halide such as, for example, stannic chloride, stannic bromide, and stannic iodine; an stannic carboxylate such as, for example, stannic formate, stannic acetate, stannic propionate, stannic butyrate, stannic stearate, and stannic adipate; stannic sulfate; stannic phosphate; stannic nitrate; and mixtures thereof. The presently preferred stannic compounds are stannic chloride, stannic sulfate, stannic acetate, and combinations of two or more thereof because of their low cost and availability.

The stannous compound can be an stannous halide such as, for example, stannous chloride, stannous bromide, and stannous iodine; an stannous carboxylate such as, for example, stannous formate, stannous acetate, stannous propionate, stannous butyrate, stannous stearate, and stannous adipate; stannous sulfate; stannous phosphate; stannous nitrate; and combinations of two or more thereof. The presently preferred stannous compounds are stannous chloride, stannous sulfate, stannous acetate, and combinations of two or more thereof because of their low cost and availability.

Based on the total weight % of a water-based fluid containing composition of the present invention, the clay can be present in the composition in any concentration so long as that concentration can increase the viscosity of a water-based fluid containing the composition of the invention and can be in the range of from about 0.25 weight % to about 30 weight %, preferably about 0.5 weight % to about 25 weight %, and most preferably 1 weight % to 20 weight %. The weight % of the magnesium compound is the weight % that can retain the viscosity or control the water loss of a water-based fluid combining the compositions of the invention and is generally in the range of from about 0.001 weight % to about 3 weight %, preferably about 0.01 weight % to about 2 weight %, and most preferably 0.02 weight % to 1 weight %. The weight % of the metal aluminate or the metal compound or combinations thereof present in a water-based fluid containing the composition of the invention is the weight % that can retain the viscosity or control the water loss of the fluid and generally is in the range of from about 0.001% to about 3%, preferably about 0.01% to about 2%, and most preferably from 0.02% to 1%.

The concentration of water-thickening amount of the polymer in a water-based fluid containing the composition of the invention can range widely and be as suitable and convenient for the various polymers, and for the degree of gelation needed for particular strata. Generally, the concentration of polymer in the water-based fluid is an effective concentration that can increase the viscosity of a water-based fluid and is made up to a convenient strength of about 0.001 weight % to about 10 weight %, preferably about 0.002 to 5 weight and most preferably 0.005 to 3 weight %, based on the total weight of the water-based fluid equaling 100%.

The term "fatty acid", as used herein, is referred to an aliphatic carboxylic acid, an aryl carboxylic acid, a fatty acid salt, or combinations of two or more thereof. Suitable aliphatic or aryl carboxylic acids include linear carboxylic acids having about 8 to about 30 carbon atoms or more such as, for example, octanoic, nonanoic, decanoic, undecanoic, dodecanoic, tridecanoic, tetradecanoic, pentadecanoic, hexadecanoic, heptadecanoic, octadecanoic, nonadecanoic, eicsanoic, heneicosanoic, docosanoic, tricosanoic, tetraosanoic, pentacosanoic, hexacosanoic, heptacosanoic, octacosanoic, nonacoisanoic, triacontanoic, hentricontanoic, dotriacontanoic, tetratriacontanoic, and sentatrioacontanoic acid. In addition, the carboxylic acids useful in the present invention may contain branched carbon chains or pendant carboxyl groups (e.g., iso-lauric or iso-stearic acid).

Fatty acid salts suitable for use in the present invention are typically high melting solids and include the Group I, II, III or IV of the Periodic Table of The Elements metal salts of those fatty acids having from about 8 to about 30, more preferably from about 12 to about 20 carbon atoms per molecule. Examples of suitable fatty acid salts include, but are not limited to, the aluminum, calcium magnesium, sodium and zinc salts of lauric, myristic, palmitic and stearic acids. The presently preferably fatty acid salt is calcium stearate.

The weight % of the fatty acid or salt thereof, if present, can be in the range of from about 0.001 to about 1%, preferably about 0.002 to about 1%, and most preferably 0.003 to 0.5% based on the total weight of the water-based fluid equaling 100%.

The composition useful in the first embodiment of the invention can be prepared by any mixing means, such as, for example, a blender, known to one skilled in the art.

Water, a solution, or a suspension as described above, can generally be included in the water-based fluid containing the composition of the first embodiment of the invention to prepare aqueous composition. A produced brine described above can also be used as a component of the water-based fluid of the first embodiment of the invention. Water, solution, suspension, or produced brine generally makes up the rest of the water-based fluid containing the composition of the invention.

A weighing agent can be added to the composition to increase the density of the water-based fluid. Suitable weighing agents include, but are not limited to barite, hematite, carbonates, galena, and combinations of two or more thereof.

According to the second embodiment of the present invention, a composition that is useful in an oil field application is provided which comprises a polymer and a metal compound wherein the oil field application can be substantially retaining the viscosity of a clay-containing, water-based fluid, or preventing water loss of a clay-containing, water-based fluid, or both. The scope, definition, and weight-% of the polymer and metal compound are the same as those disclosed in the first embodiment of the invention.

According to the third embodiment of the invention, a process for retaining the viscosity of or controlling water loss of a clay-containing water-based fluid comprises contacting the fluid with a composition which comprises a polymer; a magnesium compound; an additive selected from the group consisting of a metal aluminate, a metal compound, and combinations of two or more thereof. A preferred embodiment comprises contacting the fluid with the composition which further comprises a fatty acid or a salt thereof. Alternatively, the process of the third embodiment of the invention can also be carried out by contacting a clay-containing, water-based fluid with the composition of the invention which does not contain a polymer followed by combining the resulting composition with a polymer. The scope, definition, and weight % of the clay, polymer, metal aluminate, magnesium compound, metal compound and fatty acid (or a salt thereof) are the same as those described above in the first embodiment of the invention.

The clay-containing, water-based fluid can be used in well treating, drilling, workover, or completion in oil field operations by those skilled in the art. Generally, the viscosified aqueous composition can be used in any drilled wells having a temperature in the range of from about 70° F. to about 450° F., preferably about 75° F. to about 350° F., and most preferably 80° F. to 300° F. Because these oil field operations are well known to those skilled in the art, descriptions of which are omitted herein for the interest of brevity.

According to the fourth embodiment of the invention, a process for an oil field application is provided which comprises contacting a clay-containing, water-based fluid with a composition which comprises a polymer and a metal compound wherein the oil field application can be substantially retaining the viscosity of a clay-containing, water-based fluid, or preventing water loss of a clay-containing, water-based fluid, or both. The scope, definition, and weight % of the polymer and metal compound and process condition are the same as those disclosed in the third embodiment of the invention.

The following specific examples are intended to illustrate the advantages of the present invention and are not intended to unduly limit the scope of the invention.

EXAMPLE I

This example illustrates that sodium aluminate and it's blend with magnesium oxide protect viscosity and water loss of guar gum in a water based suspension for several days.

The runs were carried out as follows: Test runs in Table I were prepared by mixing the materials shown in the Table in quart jars. All mixing was done with a Multimixer unless otherwise specified. After mixing was completed, the runs were transferred into pint jars, capped, and rolled for about 16 hours at about 163° F. Then they were cooled to about 85° F., mixed for 5 minutes, and tested according to the test procedures in API RP 13B-1, Field Testing of Water-Based Drilling Fluids, Sections 2 and 3, for viscosity (AV) on Fann VG (Model 35A) viscometers and for water loss (WL). These AV and WL test results are reported under "After 1 Day" in Table II. After testing all runs were capped and kept at about 75° F. They were then warmed to about 85° F., mixed for 5 minutes, and retested. The test results shown under "After 7 Days" and "After 16 or 20 Days" in Table II represent results after about 7 Days and after more than 16 Days, respectively, from the day runs were first mixed.

TABLE I

| Materials[a] | Run | | | | | |
|---|---|---|---|---|---|---|
| | (1) | (2) | (3) | (4) | (5) | (6) |
| Tap Water, ml | 350 | 350 | 350 | 350 | 350 | 350 |
| Bentonite, g | 7.5 | 7.5 | 7.5 | 7.5 | 7.5 | 7.5 |
| 50% W/V NaOH, ml | —[b] | 0.25 | — | — | — | — |
| Mg-Oxide, g | — | — | — | 1.0 | — | — |
| Na-Aluminate, g | — | — | — | — | 1.0 | — |
| Blend 1[c], g | — | — | — | — | — | 1.0 |
| G 308NB[d], g | 3.0 | 3.0 | 3.0 | 3.0 | 3.0 | 3.0 |
| Rev Dust[e], g | 15.0 | 15.0 | 15.0 | 15.0 | 15.0 | 15.0 |
| 50% W/V NaOH, pH | — | — | >11 | — | — | — |

[a]Materials are listed according to the order they were added. They all except water were added while mixing. After each addition, 10 minutes mixing was continued before adding the next material.
[b]—, Not present.
[c]Blend of 0.5 g magnesium oxide and 0.5 g sodium aluminate.
[d]High viscosity guar gum from NOWSCO Well Services Ltd., Calgary, Alberta T2C 2G4.
[e]Represents drill solids.

TABLE II

| Run | After 1 Day | | After 7 Days | | After 16 or 20 Days | | |
|---|---|---|---|---|---|---|---|
| | AV[a] | WL[b] | AV[a] | WL[b] | AV[a] | WL[b] | Days |
| (1) | 38.0 | 9.8 | 5.5 | 22.3 | 3.0 | 30.2 | 16 |
| (2) | 40.0 | 10.2 | 9.0 | 14.4 | 3.0 | 23.7 | 16 |
| (3) | 39.0 | 9.6 | —[c] | —[c] | 45.0 | 6.9 | 20 |
| (4) | 44.5 | 10.0 | 8.0 | 17.9 | 7.0 | 114.8 | 16 |
| (5) | 47.5 | 9.4 | 46.5 | 8.8 | 46.5 | 7.4 | 20 |
| (6) | 40.5 | 9.3 | 49.0 | 8.2 | 57.0 | 6.4 | 20 |

[a]AV is Apparent Viscosity, Cps.
[b]WL is Water loss, ml/30 minutes.
[c]—, Not measured.

Test results in Table II show that sodium-aluminate containing run (5) maintained its viscosity and water loss control after aging for 20 days. Run (6), which contained the sodium aluminate:magnesium oxide blend, had higher viscosity and better water loss control after 20 days than after 1 or 7 days. These results were unexpected from the results of individual components of the blend (runs (4) and (5)). Control run (1), which contained only clay and polymer, lost almost all of its viscosity after only 7 days and its water loss was increased by over 100%.

EXAMPLE II

This example illustrates that inorganic and organic aluminum compounds and sodium stannate protect viscosity and water loss control of guar gum in a water based suspension for several days.

The runs were carried out according to the procedure described in Example I. The runs and test results are reported in Table III and Table IV, respectively. The test results under "After 7 Days" and "After 16 Days" in Table IV represent results after about 7 days and after about 16 days, respectively, from the day runs were first mixed. In Table III, runs (11), (12), and (13) were the same as runs (1), (2), and (3), respectively, in Table I.

TABLE III

| Materials[a] | Run (11) | (12) | (13) | (14) | (15) | (16) |
|---|---|---|---|---|---|---|
| Tap Water, ml | 350 | 350 | 350 | 350 | 350 | 350 |
| Bentonite, g | 7.5 | 7.5 | 7.5 | 7.5 | 7.5 | 7.5 |
| 50% W/V NaOH, ml | —[b] | 0.25 | — | — | — | — |
| Mg-Oxide, g | — | — | 1.0 | — | — | — |
| Na-Stannate | — | — | — | 1.0 | — | — |
| Al-Chlorohydrate, g | — | — | — | — | 1.0 | — |
| Al-Acetate, g | — | — | — | — | — | 1.0 |
| G 308NB[c], g | 3.0 | 3.0 | 3.0 | 3.0 | 3.0 | 3.0 |
| Rev Dust[d], g | 15.0 | 15.0 | 15.0 | 15.0 | 15.0 | 15.0 |

[a]See footnote "a", Table I.
[b]—, Not present.
[c]See footnote "d", Table I.
[d]See footnote "e", Table I.

TABLE IV

| | After 1 Day | | After 7 Days | | After 16 Days | |
|---|---|---|---|---|---|---|
| Run | AV[a] | WL[b] | AV[a] | WL[b] | AV[a] | WL[b] |
| (11) | 38.0 | 9.8 | 5.5 | 22.3 | 3.0 | 30.2 |
| (12) | 40.0 | 10.2 | 9.0 | 14.4 | 3.0 | 23.7 |
| (13) | 44.5 | 10.0 | 8.0 | 17.9 | 7.0 | 114.8 |
| (14) | 99.0 | 10.2 | 49.5 | 9.4 | 3.0 | 18.4 |
| (15) | 54.0 | 8.8 | 49.5 | 9.2 | 48.0 | 8.6 |
| (16) | 39.0 | 9.4 | 36.5 | 9.5 | 36.0 | 8.8 |

[a]See footnote "a", Table II.
[b]See footnote "b", Table II.

Test results in Table IV show that aluminum chlorohydrate containing run (15), and aluminum acetate-containing run (16) maintained almost all viscosity and had little or no water loss change for more than 16 days. The sodium stannate-containing run (14) retained much better viscosity than control run (11).

EXAMPLE III

This example illustrates performance of a blend of sodium aluminate and magnesium oxide and caustic soda solution in a water based suspension containing clay and starch for several days.

The runs were carried out according to the procedure described in Example I. The runs and the test results are shown in Table V and Table VI, respectively.

TABLE V

| Materials[a] | Run (21) | (22) |
|---|---|---|
| Tap water, ml | 350 | 350 |
| Bentonite, g | 7.5 | 7.5 |
| Blend 1[b], g | —[c] | 1.0 |
| Starpak II(3223)[d], g | 6 | 6 |
| Rev Dust[e], g | 15 | 15 |
| 50% W/V NaOH, pH | >11 | — |

[a]See footnote "a", Table I.
[b]See footnote "c", Table I.
[c]—, Not present.
[d]Starpark II(3223) is a carboxymethyl starch obtained from Chemstar, Minneapolis, Minnesota (lot #MC018A).
[e]See footnote "e", Table I.

TABLE VI

| | After 1 Day | | | After 20 Days | | |
|---|---|---|---|---|---|---|
| Run | AV[a] | WL[b] | pH | AV[a] | WL[b] | pH |
| (21) | 44.0 | 4.8 | 10.0 | 3.5 | 17.8 | 8.1 |
| (22) | 44.0 | 4.6 | 9.7 | 6.0 | 10.2 | 9.3 |

[a]See footnote "a", Table II.
[b]See footnote "b", Table II.

As shown in Table VI, run (22) which contained the blend of magnesium oxide and sodium aluminate had better water loss control than the control run (21) which contained only caustic soda for pH adjustment.

EXAMPLE IV

This example illustrates performance of magnesium oxide, sodium aluminate, sodium stannate, and aluminum chlorohydrate in a water-based suspension containing clay and starch for several days.

The runs were carried out according to the procedure described in Example I. The runs and the test results are shown in Table VII and Table VIII, respectively.

TABLE VII

| Materials[a] | Run (31) | (32) | (33) | (34) | (35) | (36) |
|---|---|---|---|---|---|---|
| Tap Water, ml | 350 | 350 | 350 | 350 | 350 | 350 |
| Bentonite, g | 7.5 | 7.5 | 7.5 | 7.5 | 7.5 | 7.5 |
| 50% W/V NaOH, ml | —[b] | 0.25 | — | — | — | — |
| Mg-Oxide, g | — | — | 1.0 | — | — | — |
| Na-Aluminate, g | — | — | — | 0.5 | — | — |
| Na-Stannate, g | — | — | — | — | 0.5 | — |
| Al-Chlorohydrate, g | — | — | — | — | — | 0.5 |
| Starpak II(3223)[c], g | 6 | 6 | 6 | 6 | 6 | 6 |
| Rev Dust[d], g | 15 | 15 | 15 | 15 | 15 | 15 |

[a]See footnote "a", Table I.
[b]—, Not present.
[c]See footnote "d", Table V.
[d]See footnote "e", Table I.

TABLE VIII

| | After 1 Day | | | After 8 Days | | After 20 Days | | |
|---|---|---|---|---|---|---|---|---|
| Run | AV[a] | WL[b] | pH | AV[a] | WL[b] | AV[a] | WL[b] | pH |
| (31) | 46.0 | 5.3 | 7.6 | 21.5 | 4.6 | 5.5 | 7.8 | 6.1 |
| (32) | 45.0 | 5.0 | 9.1 | 16.0 | 4.5 | 4.5 | 8.2 | 7.0 |
| (33) | 55.0 | 5.2 | 8.4 | 48.0 | 4.6 | 11.6 | 22.0 | 7.5 |
| (34) | 42.5 | 5.7 | 9.7 | 16.5 | 5.1 | 4.0 | 10.5 | 7.1 |
| (35) | 59.5 | 4.5 | 8.3 | 20.0 | 4.2 | 5.0 | 6.5 | 6.5 |
| (36) | 37.5 | 6.3 | 7.2 | 30.5 | 5.8 | 15.5 | 5.6 | 6.2 |

[a]See footnote "a", Table II.
[b]-See footnote "b", Table II.

As shown in Table VIII, the aluminum chlorohydrate-containing run (36), which had about the same pH as control run (31), maintained better water loss and viscosity than run (31) after aging for up to 20 days. The magnesium oxide-containing run (33) and sodium aluminate-containing run (34) did not maintain water loss as well as run (31). These results indicate that the water-based fluid containing a metal compound such as aluminum chlorohydrate was more useful for protecting water loss of a viscosified fluid when it was necessary to maintain pH of the aqueous fluid below 9.0.

EXAMPLE V

This example illustrates performance of various metal compounds in a salt water drilling fluid containing attapulgite clay and starch.

The runs were carried out as follows: While mixing with a Multimixer, a salt water drilling fluid was prepared by using 3000 ml of tap water, 156 g of NaCl, 111 g of attapulgite clay, 131 g of Rev dust, 1.5 ml of 50% W/V NaOH solution, and 52 g of Drillstar HT (a pregelatinized drilling starch commercially available from Baker Chemicals, Inc., Houston, Tex.). The mixing time was 5 minutes after NaCl, one hour after attapulgite clay, 15 minutes after Rev dust, 30 minutes after NaOH, and 3 hours after Drillstar HT additions. To 320 grams samples of this drilling fluid in pint jars, 0.9 gram of materials shown in Table IX were added while mixing with the Multimixer. After the fluid was mixed for 20 minutes, the fluid was tested immediately. The test temperature was about 85° F. These test results are shown under "Initial" in Table IX. After testing, all samples were capped and kept at about 75° F. They were then warmed to about 85° F., stirred for 5 minutes, followed by adding about 0.05 g of octyl alcohol to each sample to defoam, and the defoamed fluid was retested. The results shown under "After 7 Days", "After 10 Days", and "After 14 Days" in Table IX represent the results obtained after about 7 days, 10 days, and 14 days, respectively, from the day the runs were first mixed.

TABLE IX

| Run | Material Added | Initial AV$^a$ | Initial WL$^b$ | After 7 Days AV$^a$ | After 7 Days WL$^b$ | After 10 Days AV$^a$ | After 10 Days WL$^b$ | After 14 Days WL$^b$ |
|---|---|---|---|---|---|---|---|---|
| (41) | None | 20.0 | 6.4 | 16.0 | 17.9 | 13.0 | 117.2 | —$^c$ |
| (42) | Mg-Oxide | 28.0 | 8.2 | 21.5 | 14.4 | 15.5 | 14.7 | 116.2 |
| (43) | Al-Acetate | 26.5 | 7.8 | 26.5 | 6.8 | 24.5 | 7.8 | 31.6 |
| (44) | Al-Chloro-hydrate | 28.0 | 9.0 | 28.0 | 12.6 | 27.0 | 14.2 | 13.6 |
| (45) | Al-Sulfate | 23.0 | 6.2 | 26.0 | 7.4 | 22.0 | 16.3 | 22.7 |
| (46) | Na-Aluminate | 21.0 | 64.3 | 19.5 | 15.7 | 16.0 | 14.6 | 12.3 |
| (47) | Na-Borate | 11.0 | 29.7 | 15.5 | 124.5 | — | — | — |
| (48) | Na-Stannate | 34.0 | 16.4 | 30.5 | 19.8 | 9.0 | 116.4 | — |
| (49) | Zn-Sulfate | 26.5 | 7.3 | 26.0 | 8.8 | 26.0 | 8.5 | 8.0 |

$^a$See footnote "a", Table II.
$^b$See footnote "b", Table II.
$^c$—, Not measured.

Table IX shows that, in the initial tests, all runs except runs (46) and (47) which contained sodium aluminate and sodium borate, respectively, had good water loss control.

The test results in Table IX also show that, after 7 days of aging, all runs retained substantially the initial viscosity. The results further show that all runs, except run (47) which contained sodium borate, had good water loss control.

Test results also show that, after 10 days of aging, all runs retained over 50% of their initial viscosity with run (48) which contained sodium stannate an exception. Furthermore, run (48) and control run (41) lost their water loss control after 10 days of aging whereas all other runs had very low water loss control (compared with the control run 41).

However, after 14 days of aging, the runs containing magnesium oxide (run 42) lost its water loss control whereas runs (44), (46), and (49) maintained better water loss control than runs (43) and (45).

EXAMPLE VI

This example illustrates performance of iron and tin sulfate in a salt water drilling fluid containing attapulgite clay and starch.

The runs were carried out as follows: While mixing with a Multimixer, a salt water drilling fluid was prepared using 52 g of NaCl and 37 g of attapulgite clay per 1000 ml of tap water. The pH of this fluid was adjusted to 9.0 by adding 50% (W/V) NaOH solution. To 370 grams of samples of the fluid in quart jars, 6 grams of Drillstar HT starch was added while mixing with the Multimixer. The fluid was mixed for 20 minutes. Thereafter, 1.0 gram of each material shown in Table X was added while mixing followed by mixing for 20 minutes after the addition. During this 20 minutes mixing, 50% NaOH solution was added to each sample with a dropper at 5, 10, and 15 minutes of the mixing to adjust pH to the values shown in Table X. All samples were immediately transferred into pint jars and then measured for pH and water loss. These results are shown as "Initial" in Table X. After testing, they were capped and kept at about 75° F. for about 4 days. They were then mixed for 5 minutes and retested. These results are shown as "After 4 Days". They were tested again after being kept at about 75° F. for 3 more days and being again mixed for 5 minutes. These results are shown as "After 7 Days". They were then kept at about 75° F. for 3 more days, mixed for 5 minutes, and retested. These results are shown as "After 10 Days".

The results shown in Table X indicate that, after 7 days of aging, the stannous sulfate-containing run (52) had very low water loss (compared with the control run 51). Similarly, run (54) which contained ferrous sulfate had much better water loss control than the control runs (51) and (53) after 10 days of aging. The results also show that the run containing sodium sulfate did not have as good water loss control as the control run (53).

TABLE X

| Run | Material Added | Initial pH | Initial WL$^a$ | After 4 Days pH | After 4 Days WL$^a$ | After 7 Days pH | After 7 Days WL$^a$ | After 10 Days pH | After 10 Days WL$^a$ |
|---|---|---|---|---|---|---|---|---|---|
| (51) | None | 9.5 | 6.6 | 8.7 | 7.0 | 8.0 | 82.6 | 8.0 | 108.0 |
| (52) | Sn-Sulfate | 9.6 | 9.8 | 8.5 | 7.8 | 8.1 | 10.8 | 8.1 | 93.5 |
| (53) | None | 10.5 | 9.0 | 10.5 | 8.2 | 9.7 | 9.8 | 8.8 | 46.0 |
| (54) | Fe-Sulfate | 10.0 | 8.6 | 9.8 | 10.8 | 8.8 | 12.6 | 8.6 | 20.8 |
| (55) | Na-Sulfate | 9.9 | 8.0 | 9.6 | 6.6 | 8.5 | 51.4 | 8.3 | 89.0 |

$^a$See footnote "b", Table II.

EXAMPLE VII

This example illustrates performance of magnesium oxide, sodium aluminate, or a blend of magnesium oxide and sodium aluminate in a salt water drilling fluid containing attapulgite clay and starch.

The runs were carried out as follows: while mixing with a Hamilton Beach malt mixer, a salt water drilling fluid was prepared using 1,200 ml of tap water, 62.4 g of NaCL, 44.4 g of attapulgite clay, 52.4 g of Rev dust, 0.6 ml of 50% W/V NaOH solution, and 20.8 g Starpak II(3223). The mixing time was 5 minutes after NaCl, one hour after attapulgite clay, 15 minutes after Rev dust, 30 minutes after NaOH, and 3 hours after Starpak II additions. To samples (320 grams) of this drilling fluid in pint jars, 0.9 gram of materials shown in Table XI were added while mixing with the Multimixer. After being mixed for 20 minutes, about 0.05 g of octyl alcohol was added to defoam, and then tested. The test temperature was about 85° F. These test results are reported under "Initial" in Table XI. After testing, they were capped and kept at about 75° F. Then they were warmed to 85° F., stirred 5 minutes, defoamed by adding about 0.05 g of octyl alcohol, and retested. The test results reported under "After 7 Days" and "After 11 Days" in Table XI represent results after 7 days and after 11 days, respectively, from the day runs were prepared.

TABLE XI

| Run | Material Added | Initial | | After 7 Days | | After 11 Days | |
|---|---|---|---|---|---|---|---|
| | | AV[a] | WL[b] | AV[a] | WL[b] | AV[a] | WL[b] |
| (61) | None | 18.0 | 9.2 | 16.5 | 18.2 | 13.5 | 116.7 |
| (62) | Mg-Oxide | 23.0 | 14.6 | 17.0 | 20.2 | 12.0 | 25.8 |
| (63) | Na-Aluminate | 15.5 | 23.9 | 22.0 | 16.6 | 22.5 | 13.5 |
| (64) | Blend 1[c] | 26.0 | 16.4 | 21.0 | 19.2 | 14.5 | 17.9 |

[a]See footnote "a", Table II.
[b]See footnote "b", Table II.
[c]See footnote "c", Table I.

The results shown in Table XI show that run (64) which contained the sodium aluminate:magnesium oxide blend, maintained water loss after 11 days whereas control run (61) lost it completely. Sodium aluminate containing run (63) also maintained good water loss after 11 days and had the highest viscosity, but it's water loss was the highest in initial tests. The magnesium oxide-containing run (62) had good water loss in initial tests, but it increased badly after 11 days.

EXAMPLE VIII

This example illustrates effect of sodium aluminate on xanthan biopolymer in a water-based suspension for several days.

The runs were carried out according to the procedure described in Example I. The runs and test results are shown in Table XII and Table XIII, respectively.

TABLE XII

| | Run | | |
|---|---|---|---|
| Materials[a] | (71) | (72) | (73) |
| Tap Water, ml | 350 | 350 | 350 |
| Bentonite, g | 7.5 | 7.5 | 7.5 |
| Na-Aluminate, g | —[b] | 0.5 | 1.0 |
| XC[c] Polymer, g | 1.25 | 1.25 | 1.25 |
| Rev Dust[e], g | 15 | 15 | 15 |

[a]See footnote "a", Table I.
[b]—, Not present.
[c]XC is a Xanthan biopolymer obtained from Kelco Oil Field Group, Inc; Houston, Texas.
[d]See footnote "e", Table I.

TABLE XIII

| | After 1 Day | | After 8 Days | | After 21 Days | |
|---|---|---|---|---|---|---|
| Run | AV[a] | WL[b] | AV | WL | AV | WL |
| (71) | 15.0 | 10.9 | 15.0 | 10.3 | 13.0 | 11.2 |
| (72) | 17.5 | 12.1 | 14.5 | 12.2 | 12.0 | 15.4 |
| (73) | 16.0 | 14.7 | 15.0 | 13.4 | 15.0 | 13.7 |

[a]See footnote "a", Table II.
[b]See footnote "b", Table II.

As shown in Table XIII, control run (71) as well as the other two runs with sodium-aluminate maintained most of their viscosity and water loss control for more than 21 days.

EXAMPLE IX

This example illustrates that a blend of magnesium oxide, sodium aluminate, aluminum chlorohydrate, and calcium stearate protects viscosity and water loss of guar gum in a water-based suspension for several days.

The test runs were prepared according to the procedure described in Example I. The runs are shown in Table XIV. After the fluid was transferred into pint jars, they were tested immediately. The jars were then capped and kept at about 75° F. for about 2 days. Thereafter, they were rolled for 14 hours in a roller oven set at 160° F., cooled to about 85° F., mixed 5 for minutes, and again tested. These test results are reported under "After Rolling at 160° F." in Table XV. After testing, they were again capped, kept at 75° F. for 23 more days, and retested at about 85° F. after being mixed for 5 minutes. These test results are reported under "After 26 Days" in Table XV.

TABLE XIV

| | Run | | |
|---|---|---|---|
| Materials[a] | (91) | (92) | (93) |
| Tap Water, ml | 350 | 350 | 350 |
| Bentonite, g | 7.5 | 7.5 | 7.5 |
| K-Chloride, g | 2.0 | —[b] | — |
| D053 Blend[c], g | — | 1.0 | — |
| MMH[d], g | — | — | 1.0 |
| G 308NB[e], g | 3.0 | 3.0 | 3.0 |
| Rev Dust[f], g | 15 | 15 | 15 |
| 50% W/V NaOH, pH | 11 | — | — |

[a]See footnote "a", Table I.
[b]—, Not present.
[c]Blend of 0.49 g magnesium-oxide, 0.49 g sodium-aluminate, 0.1 g aluminum chlorohydrate, and 0.1 g calcium-stearate.
[d]Mixed metal hydroxide is a commercial product obtained from the Dow Chemical Company, Midland, Michigan.
[e]See footnote "d", Table I.
[f]See footnote "e", Table I.

TABLE XV

| | After Rolling at 160° F. | | After 26 Days | |
|---|---|---|---|---|
| Run | AV[a] | WL[c] | AV[a] | WL[c] |
| (91) | 34.0 | 14.1 | 3.0 | 52.7 |
| (92) | 41.0 | 9.6 | 52.0 | 8.2 |
| (93) | 36.0 | 9.1 | 11.0 | 103.0 |

[a]See footnote "a", Table II.
[b]See footnote "b", Table II.

As shown in Table XIV, the run that contained D053 blend (run 92) maintained its viscosity and had very low water loss (compared with runs 91 and 93) after aging for 26 days.

The results shown in the above examples clearly demonstrate that the present invention is well adapted to carry out the objects and attain the end and advantages mentioned as well as those inherent therein. While modifications may be made by those skilled in the art, such modifications are encompassed within the spirit of the present invention as defined by the specification and the claims.

That which is claimed:

1. A composition comprising a polymer, a magnesium compound, and a metal aluminate wherein said polymer is selected from the group consisting of a polysaccharide, a cellulose ether, an acrylamide-containing polymer, and combinations of two or more thereof; the metal of said metal aluminate is selected from the group consisting of an alkali metal, an alkaline earth metal, and combinations of two or more thereof; and said polymer, magnesium compound, and metal aluminate are each present in an effective amount sufficient to viscosify a clay-containing, water-based fluid.

2. A composition according to claim 1 further comprising a metal compound wherein the metal of said metal compound is selected from the group consisting of aluminum, iron, manganese, zinc, tin, and combinations of two or more thereof.

3. A composition according to claim 1 wherein said polymer is selected from the group consisting of a starch, a gum, a heteropolysaccharide, and combinations of two or more thereof.

4. A composition according to claim 1 wherein said polymer is a starch.

5. A composition according to claim 4 wherein said starch is carboxymethyl starch.

6. A composition according to claim 1 wherein said polymer is guar gum.

7. A composition according to claim 2 wherein said metal compound is selected from the group consisting of an aluminum halide, an aluminum carboxylate, aluminum sulfate, aluminum phosphate, aluminum nitrate, an iron halide, an iron carboxylate, iron sulfate, iron phosphate, iron nitrate, a manganese halide, a manganese carboxylate, manganese sulfate, manganese phosphate, manganese nitrate, a zinc halide, a zinc carboxylate, zinc sulfate, zinc phosphate, zinc nitrate, a tin halide, a tin carboxylate, tin sulfate, tin phosphate, tin nitrate, and combinations of two or more thereof.

8. A composition according to claim 2 wherein said metal compound is selected from the group consisting of aluminum chloride, aluminum sulfate, aluminum acetate, iron chloride, iron sulfate, iron acetate, manganese chloride, manganese sulfate, manganese acetate, zinc chloride, zinc sulfate, zinc acetate, tin chloride, tin sulfate, tin acetate, and combinations of two or more thereof.

9. A composition according to claim 1 further comprising a clay selected from the group consisting of kaolinite, halloysite, vermiculite, chlorite, attapulgite, smectite, montmorillonite, illite, saconite, sepiolite, palygorskite, Fuller's earth, and combinations of two or more thereof.

10. A composition according to claim 9 wherein said clay is sodium montmorillonite (bentonite).

11. A composition according to claim 1 wherein the weight percent of said clay is in the range of from about 0.25% to about 30% based on total weight % of the water-based fluid equaling 100.

12. A composition according to claim 1 wherein the weight percent of said clay is in the range of from 1% to 20%.

13. A composition according to claim 1 wherein the weight percent of said polymer is in the range of from about 0.001% to about 10% based on the total weight % of said water-based fluid equaling 100%.

14. A composition according to claim 1 wherein the weight percent of said polymer is in the range of from 0.005% to 3% based on the total weight % of said water-based fluid equaling 100%.

15. A composition according to claim 2 wherein the weight percent of said metal aluminate is in the range of from about 0.001% to about 3% based on the total weight % of said water-based fluid equaling 100%.

16. A composition according to claim 2 wherein the weight percent of said metal aluminate is in the range of from 0.02% to 1%.

17. A composition capable of viscosifying a clay containing water-based fluid comprising a polymer, a magnesium compound, a metal aluminate, and a metal compound wherein said polymer is selected from the group consisting of a starch, a gum, a heteropolysaccharide, and combinations of two or more thereof; said magnesium compound is selected from the group consisting of magnesium oxide, magnesium chloride, magnesium hydroxide, magnesium acetate, magnesium formate, magnesium propionate, magnesium butyrate, magnesium citrate, magnesium lactate, and combinations of two or more thereof; said metal aluminate is selected from the group consisting of an alkali metal aluminate, and alkaline earth metal aluminate, and combinations of two or more thereof; and said metal compound is selected from the group consisting of aluminum chloride, aluminum sulfate, aluminum acetate, iron chloride, iron sulfate, iron acetate, manganese chloride, manganese sulfate, manganese acetate, zinc chloride, zinc sulfate, zinc acetate, tin chloride, tin sulfate, tin acetate, and combinations of two or more thereof.

18. A composition according to claim 17 wherein said composition further comprises a clay; said polymer is selected from a starch, a gum, and combinations of two or more thereof; said magnesium compound is magnesium oxide; said metal aluminate is sodium aluminate; and said metal compound is selected from the group consisting of aluminum chlorohydrate, aluminum acetate, aluminum sulfate, zinc sulfate, stannous sulfate, ferrous sulfate, and combinations of two or more thereof.

19. A composition according to claim 18 wherein said starch is carboxymethyl starch and said gum is guar gum.

20. A composition according to claim 1 wherein said metal aluminate is sodium aluminate.

21. A composition according to claim 1 wherein said magnesium compound is selected from the group consisting of magnesium oxide, magnesium chloride, magnesium hydroxide, magnesium acetate, magnesium formate, magnesium propionate, magnesium butyrate, magnesium citrate, magnesium lactate, and combinations of two or more thereof.

22. A composition according to claim 1 wherein said magnesium compound is magnesium oxide.

23. A composition according to claim 1 wherein the weight percent of said magnesium compound is in the range of from about 0.001% to about 3% based on the total weight % of said water-based fluid equaling 100%.

24. A composition according to claim 1 wherein said composition further comprising a fatty acid or a salt thereof.

25. A composition according to claim 24 wherein said salt of fatty acid is calcium stearate.

26. A composition capable of viscosifying a clay-containing, water-based fluid comprising a polymer, a magnesium compound, a sodium aluminate, and a metal compound wherein said polymer is a polysaccharide selected from the group consisting of a starch, a gum, a heteropolysaccharide, and combinations of two or more thereof, said metal compound is selected from the group consisting of aluminum chloride, aluminum sulfate, aluminum acetate, iron chloride, iron sulfate, iron acetate, manganese chloride, manganese sulfate, manganese acetate, zinc chloride, zinc sulfate, zinc acetate, tin chloride, tin sulfate, tin acetate, and combinations of two or more thereof, and said magnesium compound is selected from the group consisting of magnesium oxide, magnesium hydroxide, magnesium acetate, and combinations of two or more thereof.

27. A composition according to claim 26 wherein said composition further comprises a clay; said polymer is selected from a starch, a gum, and combinations of two or more thereof; and said metal compound is selected from the group consisting of aluminum chlorohydrate, aluminum acetate, aluminum sulfate, zinc sulfate, stannous sulfate, ferrous sulfate, and combinations of two or more thereof.

28. A composition according to claim 26 wherein said starch is carboxymethyl starch and said gum is guar gum.

29. A composition according to claim 26 further comprising a fatty acid or a salt thereof.

30. A process for an oil field operation comprising contacting a water-based fluid with a composition which comprises a polymer; a magnesium compound; and a metal aluminate wherein said polymer is selected from the group consisting of a polysaccharide, a cellulose ether, an acrylamide-containing polymer, and combinations of two or more thereof; said metal aluminate is selected from the group consisting of an alkali metal aluminate, an alkaline earth metal aluminate, and combinations of two or more thereof; and said polymer, metal aluminate, and magnesium compound are each present in an effective amount sufficient to viscosify said water-based fluid.

31. A process according to claim 30 wherein said composition further comprises a metal compound whose metal is selected from the group consisting of aluminum, iron, manganese, zinc, tin, and combinations of two or more thereof.

32. A process according to claim 30 wherein said polymer is selected from the group consisting of a starch, a gum, a heteropolysaccharide, and combinations of two or more thereof.

33. A process according to claim 32 wherein said starch is carboxymethyl starch.

34. A process according to claim 30 wherein said polymer is guar gum.

35. A process according to claim 30 wherein said metal aluminate is sodium aluminate.

36. A process according to claim 31 wherein said metal compound is selected from the group consisting of aluminum chloride, aluminum chlorohydrate, aluminum sulfate, aluminum acetate, iron chloride, iron sulfate, iron acetate, manganese chloride, manganese sulfate, manganese acetate, zinc chloride, zinc sulfate, zinc acetate, tin chloride, tin sulfate, tin acetate, and combinations of two or more thereof.

37. A process according to claim 30 wherein said magnesium compound is selected from the group consisting of magnesium oxide, magnesium chloride, magnesium hydroxide, magnesium acetate, magnesium formate, magnesium propionate, magnesium butyrate, magnesium citrate, magnesium lactate, and combinations of two or more thereof.

38. A process according to claim 30 wherein said magnesium compound is magnesium oxide.

39. A process according to claim 30 wherein said composition comprises a clay.

40. A process according to claim 30 wherein the weight percent of said polymer is in the range of from 0.005% to 3% based on the total weight % of said water-based fluid equaling 100%.

41. A process according to claim 30 wherein the weight percent of said metal aluminate is in the range of from 0.02% to 1% based on the total weight % of the aqueous composition containing clay equaling 100%.

42. A process according to claim 30 wherein the weight percent of said magnesium compound is in the range of from 0.02% to 1% based on the total weight % of said water-based fluid equaling 100%.

43. A process according to claim 31 wherein the weight percent of said metal compound is in the range of from 0.02% to 1% based on the total weight % of said water-based fluid equaling 100%.

44. A process according to claim 30 wherein said composition further comprising a fatty acid or a salt thereof.

45. A process according to claim 44 wherein said salt of fatty acid is calcium stearate.

46. A process for an oil field operation comprising contacting a water-based fluid with a composition which comprises a polymer, a magnesium compound, sodium aluminate, a metal compound, and a clay wherein said polymer is selected from the group consisting of a starch, a gum, and combinations of two or more thereof, said magnesium compound is selected from the group consisting of magnesium oxide, magnesium hydroxide, magnesium acetate, and combinations of two or more thereof, and said metal compound is selected from the group consisting of aluminum chloride, aluminum sulfate, and combinations thereof.

47. A process according to claim 46 wherein said polymer is guar gum, said magnesium compound is magnesium oxide, said metal compound is aluminum chloride, and said clay is sodium montmorillonite (bentonite).

48. A composition according to claim 2 further comprising a clay.

* * * * *